United States Patent Office 3,420,669
Patented Jan. 7, 1969

3,420,669
PHOTODEVELOPABLE, DIRECT-PRINT COMPOSITIONS CONTAINING CUPROUS SALTS
Edward Arthur Sutherns and Hans Hirsch, London, England, assignors to Eastman Kodak Company, Rochester, N.Y., a corporation of New Jersey
No Drawing. Continuation-in-part of application Ser. No. 376,246, June 18, 1964. This application Sept. 12, 1967, Ser. No. 667,091
Claims priority, application Great Britain, June 8, 1967, 26,609/67, 26,610/67
U.S. Cl. 96—108    36 Claims
Int. Cl. G03c 1/28

ABSTRACT OF THE DISCLOSURE

Photodevelopable, direct-print compositions containing cuprous salts provide direct-print image records having increased image discrimination. In one aspect of this invention, cuprous iodide is added to a silver halide emulsion wherein the halide of said silver halide is predominantly bromide. Another aspect of this invention relates to a new process for preparing said direct-print composition.

---

This application is a continuation-in-part of Sutherns and Hirsch, U.S. application No. 376,246 filed June 18, 1964.

This invention relates to light-sensitive compositions and to photographic materials prepared therefrom. In one aspect this invention relates to new direct-print compositions. In another aspect this invention relates to novel emulsion compositions which provide an improved image record in a direct-print emulsion.

Light-sensitive photographic compositions, which are becoming of increasing importance, are those which have the physical characteristics necessary to form direct-prints. These direct-print compositions form, on imagewise exposure to high intensity light, a latent image which can be developed into a visible image by exposing the material uniformly to light of relatively low intensity. This development by exposure to light is herein termed "photodevelopment." Photodevelopable, direct-print compositions are of particular use for applications where a record is required almost immediately and without the trouble of wet-processing. One such application is the recording of the movement of a high-intensity oscillograph spot.

Several recent publications disclose various types of direct-print compositions which can be used to produce an image record without chemical development. However, extensive research has been devoted to finding improved direct emulsions which have better direct-print properties such as improved image discrimination ($D_{max}-D_{min}$) upon photodevelopment, improved image stability upon exposure of the image records to surrounding room light and the like.

Therefore, it is an object of this invention to provide new photographic emulsions.

It is another object of this invention to provide new direct-print compositions which have low background density after photodevelopment.

It is another object to provide new direct-print compositions which have good image discrimination stability upon long exposure to room light.

It is another object of this invention to provide new direct-print compositions which can be coated and dried at high speeds without substantial losses in image quality when subsequently exposed and photodeveloped.

These and other objects of the invention are accomplished with certain radiation sensitive, silver halide precipitates in admixture with cuprous salts. In one aspect of the invention the silver halides are prepared in an acidic aqueous medium containing a water soluble thiocyanate and/or a thioether. In one aspect of this invention, soluble sulfites are added to the composition. In another aspect of this invention, a thiourea halogen acceptor is added to the silver halide-cuprous salt composition. In still another aspect of the invention, cadmium salts and stannous chloride are added to the compositions. In still another aspect of the invention, reducing sugars are added to the compositions.

The silver halide of the present compositions can be prepared in the absence of a colloidal binder, or a precipitate prepared in an aqueous dispersion of a colloidal binder (i.e., a photographic silver halide emulsion). The silver halide emulsions are prepared by methods which yield emulsions having good photodevelopment, direct-print characteristics. Such methods are described in U.S. Patent 2,592,250; Glafkides, Photographic Chemistry, vol. 1, pp. 31–2, Fountain Press, London; Sutherns, U.S. Patent 3,260,605, issued July 12, 1966; and McBride, U.S. Patents 3,287,137 issued Nov. 22, 1966, and 3,271,157 issued Sept. 6, 1966, wherein is disclosed the preparation of silver halide emulsions with organic thioether silver halide solvents present during the grain growth of the silver halide. In certain embodiments the grain growth can be interrupted during precipitation of the silver halide in the presence of a thioether. Generally about .1 to 25 g. of such thioethers per mole of silver halide are used. Typical of such thioethers are 3,6-dithia-1,8-octanediol, 1,10 - dithia-4,7,13,16-tetraoxacyclooctadecane, 7,10 - diaza-1,16-dicarboxamido - 3,14 - dithiahexadecane-6,11-dione, and 1,17-di-(N-ethylcarbamyl)-6,12-dithia-9-oxaheptadecane. Water soluble thiocyanates can also be used alone or in combination with thioethers during the precipitation of the silver halide. Typical useful thiocyanates are the alkali metal thiocyanates such as sodium thiocyanate and potassium thiocyanate.

The so-called "internal image" emulsions are useful in the invention, such emulsions are prepared with silver halide grains wherein a substantial amount, and preferably a predominant amount, of the sensitivity to radiation is internal to the grains. Typically, such internal image emulsions are those which, when measured according to normal photographic techniques by coating a test portion of the emulsion on a transparent support, exposing to a light intensity scale having a fixed time between $1 \times 10^{-6}$ and 1 second, bleaching 5 minutes in a 0.3% potassium ferricyanide solution at 65° F. and developing for about 5 minutes at 65° F. in Developer B below (an "internal-type" developer), have a sensitivity, measured at a density of 0.1 above fog, greater than the sensitivity of an identical test portion which has been exposed in the same way and developed for 6 minutes at 68° F. in Developer A below (a "surface-type" developer).

DEVELOPER A

| | G. |
|---|---|
| N-methyl-p-aminophenol sulfate | 0.31 |
| Sodium sulfite, desiccated | 39.60 |
| Hydroquinone | 6.00 |
| Sodium carbonate, desiccated | 18.70 |
| Potassium bromide | 0.86 |
| Citric acid | 0.68 |
| Potassium metabisulfite | 1.50 |
| Water to make 1 liter. | |

DEVELOPER B

| | G. |
|---|---|
| N-methyl-p-aminophenol sulfate | 2.0 |
| Sodium sulfite, desiccated | 90.0 |
| Hydroquinone | 8.0 |
| Sodium carbonate, monohydrate | 52.5 |
| Potassium bromide | 5.0 |
| Sodium thiosulfate | 10.0 |

Water to make 1 liter.

Silver halide for a light-sensitive composition of the invention can also be prepared simply by mixing, in the absence of actinic radiation, aqueous solutions containing the necessary silver and halide ions. Silver nitrate is a convenient source of silver ions, and the sodium and potassium salts are convenient halides. The precipitate obtained can be kept wet, or dried and obtained as a powder.

It is preferred to prepare the silver halide by the "conversion" method as described below. In accordance with the "conversion" method of making silver halide including a bromide moiety, a precipitate of the silver halide more water-soluble than silver bromide (e.g., silver chloride or a silver chlorobromide) is formed in an acidic aqueous medium by mixing a water-soluble salt of silver and a water-soluble halide, the mixing time not being critical, with times ranging from 15 seconds to 3 hours being typical. The pH of the acidic aqueous ripening medium is preferably less than 4 and can be around 2 or lower. The resulting silver halide precipitate is converted to the required silver halide containing the bromide moiety in the presence of a water-soluble thiocyanate and a water-soluble bromide-containing halide. Conversion conditions are preferably chosen which favor ripening, and the temperature is typically maintained at an elevated temperature of at least 60° C. and preferably from 65° to 85° C. The water-soluble thiocyanate is added to the aqueous acidic medium at any stage up to, or during, the conversion of the grains. The conversion to the silver bromide is more generally effected over a period of from 10 minutes to 2 hours.

When an emulsion is made by the "conversion" method described above, the conditions are preferably chosen in accordance with those described above for preparation by conversion of a silver halide precipitate. It is preferable to use a photographically inert gelatin in preparing the emulsions. The mean projective areas of the silver halide grains of such emulsions is generally between about .6 and 2.5 square microns, such emulsions being characterized as "coarse-grained."

The silver halide of the light-sensitive compositions of this invention contains at least about 70 mole percent of bromide and is preferably silver bromide, a silver bromoiodide or a mixture of these. When iodide is present, it is preferred for the amount not to exceed 6 percent of the weight of the halide, and a maximum of 1 percent is particularly preferred. If chloride is present in the halide, this is preferably not in excess of about 30 mole percent because of the propensity of silver chloride to print-out rapidly. A small amount of lead ions, for example, approximately 0.25 mole percent, can usefully be included in the silver halide, and this can conveniently be incorporated by dissolving a plumbous salt such as lead nitrate in the silver salt solution used for the preparation of the halide.

Although the silver halide emulsions are generally made with an equivalent or slight excess of halide ion present, I have found it desirable to add additional water-soluble iodide to the silver halide emulsion after its precipitation, especially when a cuprous salt other than cuprous iodide is utilized in the emulsion. More generally, about .1 to 50 mole percent, and preferably about 1 to 10 mole percent of water-soluble iodide based on the silver halide emulsion is used. Illustrative water-soluble iodides include ammonium, calcium, lithium, magnesium, potassium, or sodium iodide.

In certain preferred embodiments where the silver halide emulsion is utilized a water soluble sulfite, bisulfite, metabisulfite or dithionite is added to the light-sensitive emulsion. The sulfite type compounds further improve the discrimination and light stability obtained in silver halide emulsions which contain cuprous salts. These compounds are preferably inorganic and are added to the silver halide before the cuprous salts at about .004 mole to about .4 mole of said sulfite type compounds per mole of silver halide and preferably about .01 to about .1 mole. Typical useful sulfites include sodium sulfite, sodium hydrosulfite, sodium pyrosulfite, sodium dithionite and the like.

Cuprous salts useful in the invention include cuprous bromide, cuprous chloride, cuprous thiocyanate, and preferably cuprous iodide. The cuprous salts can be added to the silver halide as a powder, as a suspension in a liquid such as water or an aqueous dispersion of a colloidal binder, or as a solution in a solvent such as acetonitrile, for example. Instead of pure solid cuprous salts, a solid solution of, for example, cuprous iodide in another salt, silver iodide for example, can be added. In the case of the preferred embodiment, cuprous iodide concentrations to be added to the silver halide are between about 3 and about 100 grams of cuprous iodide per mole of silver halide. Lower or higher concentrations have useful effects, however, the above cuprous iodide concentrations are particularly useful for improving the photodevelopment, direct-print properties such as discrimination between image and background areas of the present silver halide precipitates or compositions containing substantially no vehicle.

If both the cuprous salts and the silver halide are powders, they can be mixed together using a pestle and mortar or a ball-mill. The mixture can then be mixed with any further additives needed for preparing light-sensitive layers. If only the cuprous salt is a powder, this can be stirred into a suspension or dispersion of the silver halide in water or in a dispersion of the colloidal binder.

After the cuprous salts and the silver halide have been mixed, and preferably before coating, it can be advantageous to hold the mixture at an elevated temperature for some minutes. When the mixture is dispersed in a liquid, a holding temperature of 30°–70° C. is often suitable, whereas dry mixtures can be held at higher temperatures, even as high as 200° C.

Organic sulfur containing compounds have been found to be useful in silver halide direct-print systems containing cuprous salts. In certain preferred embodiments thioureas are added to silver halide powders or emulsions to improve the writing speed, the image/background discrimination and to provide good image record stability on prolonged photodevelopment. Thiourea compounds which provide improved writing speed in said direct-print systems include thiourea itself and fully or partially substituted thioureas which include the grouping

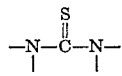

Illustrative thioureas of this general formula include ethylene thiourea, ethyl thiourea, alkyl thiourea, phenyl thiourea, ethyl phenyl thiourea and the like. However, thiourea and ethylene thiourea are preferred in the present systems to obtain maximum writing speed with minimum adverse effects on other properties of the system. The thioureas are generally added in concentrations of about .1 millimole to about .1 mole per mole of silver halide and preferably from about .6 millimole to about .08 mole.

The combination of additional metal salts along with the cuprous salts in silver halide systems of this invention also provides improved image properties in the respective photographic elements. Typical metal salts which provide improved discrimination, better image stability and/or lower $D_{min}$ in background areas include cadmium salts, such as cadmium iodide, cadmium bromide, cadmium chloride, etc. and stannous salts such as stannous chloride and the like. The additional metal salts are preferably utilized with powdered silver halide systems where the improvements in discrimination, image stability and $D_{min}$ are most noticeable. When the cadmium salts are used in combination with the cuprous salts, thiourea compounds, as mentioned above, are preferably added to the system to obtain even better image properties. In one preferred embodiment of the invention, cadmium iodide is used in combination with cuprous iodide to give an image record with good discrimination.

When stannous chloride is used in combination with cuprous salts in a direct-print silver halide system, only very small amounts are necessary to enhance discrimination and image stability. The stannous chloride ($SnCl_2 \cdot 2H_2O$) is generally used in concentrations of as low as 0.1 g. per mole of silver halide but preferably from about 0.5 g. to 5 g. per mole.

The light-sensitive compositions of this invention give on coating by any convenient technique on a photographic support useful photodevelopable, direct-print materials. Typical suitable supports include paper, polyethylene-coated paper, cellulose acetate film, polystyrene film, polyethylene terephthalate film or the like.

A simple method of coating suitable for a composition in powder form is to rub the powder over the surface of an adhesive layer coated on a support; a transparent adhesive tape can conveniently be used. Another method of coating a powdered composition comprises dispersing it in a solution of a colloidal binder, for example, an aqueous gelatin solution or a toluene solution of polystyrene, and then applying a layer of the dispersion to the support.

When the silver halide has been prepared as an emulsion in an aqueous dispersion of a colloidal binder, the sensitive composition can, if necessary after the addition of more binder, be coated in accordance with normal practice; colloid hardeners and coating aids, for instance, can be added as required.

When emulsions, according to this invention, are rapidly dried after coating, the addition of reducing sugars to the emulsions prevents losses in photographic properties of the emulsions. The addition of reducing sugars is especially advantageous to permit fast heat drying of the emulsions without an accompanying substantial loss in writing speed of the emulsion. The reducing sugars are generally utilized in the emulsions at concentrations of about 1 g. to about 500 g. per mole of silver halide and preferably from 10 to 200 g. per mole. Typical reducing sugars which can be used according to the invention include d-glucose, glyceraldehyde, arabinose, galactose, maltose, mellibiose and the like.

To produce a photographic image with a sensitive material of the invention, the light-sensitive layer of the material is first exposed to a high intensity light image. When the latter is a trace produced by the movement of an oscillograph spot, the effective exposure time is commonly within the range 0.1 to 100 microseconds. A typical instrument for exposing the photagraphic materials of the invention is an oscillograph as described in U.S. Patent 2,580,427. The latent image so produced is then photodeveloped by an overall exposure of the light-sensitive layer to relatively low intensity illumination such as with a conventional fluorescent light, a tungsten light or even ordinary daylight. A typical low-intensity illumination for carrying out the photodevelopment has an intensity of about 60 lumens per square foot.

In many cases, the image photodevelops rapidly and optimum contrast is obtained in a few minutes. Subsequent exposure to light causes some loss of contrast due, in many cases, both to image fading and a darkening of the background. However, the image stability for the preferred light-sensitive compositions of this invention, especially those containing silver halide produced by conversion, is excellent.

Unless otherwise stated, the sensitive materials produced by the methods described in the following examples were tested as follows. Part of the sensitive coatings were exposed to the illumination obtained 30 inches away from a 50 joule electronic flash unit, the flash duration being one or two microseconds. All the coatings were then photodeveloped by exposure to fluorescent light of 450 lumens per square foot intensity for 5 minutes. The yellow light reflection densities of the originally exposed, "image," and unexposed, "background," areas were now measured. The sample was then given a 1 hour, 55 minute exposure to the fluorescent light and remeasured. The materials made by coating powder compositions on transparent adhesive tape were exposed through the base, and the densities of the images obtained with them were measured from the base side when backed with a piece of white paper. The data tabulated in the examples include the density of the background area, termed the "background density" and denoted by $D_{min}$, and the density difference between the initially exposed and background areas, termed the "discrimination" and denoted by $\Delta D$. The discrimination is thus a measure of image contrast.

The relative writing speeds are assessed by exposing the coatings through a neutral step wedge to a "Microflash" lamp at 4 feet 6 inches distance and photodeveloping 10 minutes to 35 foot candles. Print-out densities were read on a reflection densitometer through a Wratten 15 filter. Writing speed results quoted are at a relative speed required to obtain a discrimination ($\Delta D$) of 0.1.

This invention can be further illustrated by the following examples of preferred embodiments thereof although it will be understood that these examples are included merely for purposes of illustration and are not intended to limit the scope of the invention unless otherwise specifically indicated.

Example 1

A solution of 39 grams of silver nitrate dissolved in 200 ml. of distilled water was added in safelighting to a solution of 30 grams of potassium bromide in 200 ml. of distilled water. The mixture was stirred during the addition, which was carried out over a 1-minute period. The initial temperature of each solution was 20° C. The resultant silver bromide precipitate was collected in a Buchner funnel, and washed in succession with five 200 ml. quantities of distilled water, 200 ml. of ethanol and 150 ml. of ether. The precipitate was then allowed to dry at room temperature. Cuprous iodide powder was added to the dry precipitate in the proportion of 0.05 gram of the iodide per gram of the silver bromide, and the powders were mixed together thoroughly with a pestle and mortar. A coating of the resultant powder on a transparent base was then obtained by spreading the powder over the surface of a transparent adhesive tape and shaking the tape to remove non-adhering particles. A sample of the coating was tested as described above, and the following results were obtained.

| Photodevelopment time | Background density ($D_{min}$) | Discrimination ($\Delta D$) |
| --- | --- | --- |
| 5 minutes | 0.37 | 0.20 |
| 2 hours | 0.60 | 0.39 |

Example 2

Three solutions were prepared having the following compositions:

Solution A

Sodium chloride _____ g__ 1.85
Potassium thiocyanate _____ g__ 3.00
1.0 N nitric acid _____ ml__ 5.60
Distilled water _____ ml__ 115.00

Solution B

| | | |
|---|---|---|
| Potassium bromide | g | 27.6 |
| Distilled water to | ml | 200.0 |

Solution C

| | | |
|---|---|---|
| Silver nitrate | g | 39.0 |
| Lead nitrate | g | 0.2 |
| Distilled water to | ml | 200.0 |

Solutions B and C were run simultaneously over a period of 40 minutes into Solution A. The solutions were stirred during mixing and were maintained at 72° C. The precipitate was washed by decantation with three 250 ml. portions of distilled water and then, after collection on a filter, washed with ethanol and ether. The precipitate was air dried, and then mixed with cuprous iodide powder in a mortar, 0.05 gram of the iodide being used per gram of the precipitate. A coating of the mixture on adhesive tape gave the following test results:

| Photodevelopment time | $D_{min}$ | $\Delta D$ |
|---|---|---|
| 5 minutes | 0.19 | 0.46 |
| 2 hours | 0.53 | 0.53 |

Example 3

Solutions were prepared having the following compositions:

Solution A

| | | |
|---|---|---|
| Potassium bromide | g | 29.0 |
| Potassium iodide | g | 0.3 |
| Distilled water | ml | 60.0 |

Solution B

| | | |
|---|---|---|
| Silver nitrate | g | 34.0 |
| Distilled water | ml | 200.0 |
| 0.880 ammonia solution to convert the silver nitrate. | | |

Solution B was added to Solution A over a period of 50 minutes, the mixture being held at 72° C. and stirred during the addition. The precipitate produced was washed and dried by the procedure outlined in Example 2. Cuprous iodide was mixed with the dry precipitate in a mortar, 0.05 gram cuprous iodide being added per gram of silver halide. The mixture gave, after coating on adhesive tape, the following test results:

| Photodevelopment time | $D_{min}$ | $\Delta D$ |
|---|---|---|
| 5 minutes | 0.25 | 0.30 |
| 2 hours | 0.43 | 0.43 |

Example 4

Solutions of the following compositions were prepared:

Solution A

| | | |
|---|---|---|
| Potassium bromide | g | 30 |
| Distilled water | ml | 60 |

Solution B

| | | |
|---|---|---|
| Silver nitrate | g | 34.0 |
| Lead nitrate | g | 0.2 |
| Distilled water | ml | 200.0 |
| 0.880 ammonia solution to convert the silver nitrate. | | |

Solution B was added to Solution A over a period of 50 minutes, the mixture being stirred and held at 72° C. meanwhile. The precipitate obtained was washed and dried by the procedure outlined in Example 2. 0.05 gram of cuprous iodide was mixed with each gram of the dry precipitate, using a pestle and mortar, and the mixture was coated on adhesive tape. The coating gave the following test results:

| Photodevelopment time | $D_{min}$ | $\Delta D$ |
|---|---|---|
| 5 minutes | 0.11 | 0.33 |
| 2 hours | 0.61 | 0.32 |

Example 5

Three solutions were prepared in accordance with the following formulas:

Solution A

| | | |
|---|---|---|
| Sodium chloride | g | 14.0 |
| Distilled water | ml | 115.0 |

Solution B

| | | |
|---|---|---|
| Silver nitrate | g | 39.0 |
| Lead nitrate | g | 0.2 |
| Distilled water | ml | 200.0 |

Solution C

| | | |
|---|---|---|
| Potassium bromide | g | 27.6 |
| Potassium thiocyanate | g | 3.0 |
| Distilled water to | ml | 200.0 |

Solution B was added to Solution A over a period of 40 minutes, the mixture being stirred continuously and held at 82° C. The mixture was then held for 2 minutes, and Solution C added to it over a 40-minute period. After a 2-minute hold, the precipitate was collected on a filter, washed and dried as described in Example 2. A coating of a mixture of the dry precipitate and cuprous iodide (0.05 gram iodide per gram of precipitate) on adhesive tape gave the following test results:

| Photodevelopment time | $D_{min}$ | $\Delta D$ |
|---|---|---|
| 5 minutes | 0.26 | 0.40 |
| 2 hours | 0.58 | 0.60 |

Example 6

A dry silver halide precipitate was prepared by the method described in Example 3 and then mixed with cuprous iodide powder, 0.1 gram of the iodide being added per gram of the silver halide. Some of the mixture was coated on adhesive tape. Another portion was heated for 15 minutes in an oven at 200° C., cooled, and coated on adhesive tape. The coatings gave the following test results:

| | Photodevelopment, 5 minutes | | Photodevelopment, 2 hours | |
|---|---|---|---|---|
| | $D_{min}$ | $\Delta D$ | $D_{min}$ | $\Delta D$ |
| Unheated | 0.17 | 0.31 | 0.51 | 0.42 |
| Heated | 0.23 | 0.41 | 0.33 | 0.58 |

Thus, the heat treatment had increased the discrimination ($\Delta D$).

Example 7

A dry silver halide precipitate was prepared as described in Example 5. Separate portions of this precipitate were mixed with cuprous iodide and a number of solid solutions of cuprous iodide in silver iodide, in each case 0.05 gram of the solid solution was added per gram of the precipitate. Coatings of the mixtures were made on adhesive tape, and when tested gave the following results:

| Percent cuprous iodide in solid solution | Photodevelopment, 5 minutes | | Photodevelopment, 2 hours | |
|---|---|---|---|---|
| | $D_{min}$ | $\Delta D$ | $D_{min}$ | $\Delta D$ |
| 10 | 0.55 | 0.49 | 0.76 | 0.62 |
| 20 | 0.53 | 0.42 | 0.77 | 0.62 |
| 40 | 0.53 | 0.42 | 0.73 | 0.60 |
| 60 | 0.53 | 0.47 | 0.78 | 0.61 |
| 100 | 0.53 | 0.43 | 0.73 | 0.63 |

Example 8

A silver halide precipitate was precipitated according to the method of Example 2, collected on a filter, washed with 250 ml. of distilled water, and then put with 50 ml. of distilled water, and 2 grams of cuprous iodide into a bottle containing ½″ diameter porcelain balls. The bottle was rotated about its axis horizontally, to "ball-mill" the mixture, for an hour. 100 ml. of a 20% gelatin solution was next added, the mixture was heated to 50° C., and then ball-milled for 30 minutes. Gelatin solution was added to make the volume up to 650 ml. and the gelatin concentrations 10%, and the mixture was then coated on a paper support. The coating was tested as described above and the following results were obtained:

| Photodevelopment time | $D_{min}$ | $\Delta D$ |
|---|---|---|
| 5 minutes | 0.23 | 0.34 |
| 2 hours | 0.29 | 0.32 |

Example 9

Silver bromide prepared by the method described in Example 5 was dispersed by ball-milling in aqueous gelatin solution as described in Example 8 and coated on paper. The coating obtained gave the following test results:

| Photodevelopment time | $D_{min}$ | $\Delta D$ |
|---|---|---|
| 5 minutes | 0.28 | 0.33 |
| 2 hours | 0.28 | 0.36 |

Example 10

A dry silver halide precipitate, prepared as described in Example 5, was mixed dry with cuprous iodide (0.05 gram iodide per gram of silver halide). Portions of the mixture were then ball-milled with:

(a) A 10% solution of polystyrene in toluene,
(b) A 10% solution of polyvinyl acetate in toluene, to give mixtures which were coated on paper. The coatings gave the following test results:

| Coating | Photodevelopment | $D_{min}$ | $\Delta D$ |
|---|---|---|---|
| (a) | 25 hours at 60 lu. hours/sq. ft. | 0.22 | 0.41 |
| (a) | 5 minutes | 0.23 | 0.32 |
| (a) | 2 hours | 0.32 | 0.30 |
| (b) | 25 hours at 60 lu. hours/sq. ft. | 0.26 | 0.42 |

Example 11

The following solutions were prepared:

Solution A
Silver nitrate _____ g__ 39.0
Distilled water _____ ml__ 200.0

Solution B
Sodium chloride _____ g__ 14.0
Inert gelatin _____ g__ 8.0
1.0 N sulfuric acid _____ ml__ 5.6
Distilled water _____ ml__ 100.0

Solution C
Potassium bromide _____ g__ 27.6
Potassium thiocyanate _____ g__ 3.0
Distilled water _____ ml__ 200.0

Solution A was added to Solution B over a period of 40 minutes, and Solution C was then added over a similar period. Throughout the grain precipitation and conversion, the temperature was maintained at 72° C. The volume of the resultant photographic emulsion per mole of silver halide was 3050 ml. To 65 ml. of the emulsion 10 ml. of water was added. The emulsion was stirred for 15 minutes at 40° C., and then coated on paper. The coating was tested, and gave the following results:

| Photodevelopment time | $D_{min}$ | $\Delta D$ |
|---|---|---|
| 10 seconds | 0.30 | 0.10 |
| 5 minutes | 0.36 | 0.29 |
| 2 hours | 0.56 | 0.14 |

Example 12

0.25 gram of cuprous iodide was added to each of two 65 ml. samples of the emulsion of Example 11, the emulsion being held at 40° C., and stirred, for 15 minutes after the addition, and then coated on paper. The cuprous iodide was added to one sample (a) as a solution in 10 ml. of acetonitrile, and to the other (b) as a suspension in 10 ml. of 2.5% aqueous gelatin solution. The coatings gave the following test results:

| Coating | Photodevelopment time | $D_{min}$ | $\Delta D$ |
|---|---|---|---|
| (a) | 10 seconds | 0.29 | 0.15 |
| (a) | 5 minutes | 0.40 | 0.45 |
| (a) | 2 hours | 0.54 | 0.26 |
| (b) | 10 seconds | 0.21 | 0.17 |
| (b) | 5 minutes | 0.41 | 0.51 |
| (b) | 2 hours | 0.48 | 0.30 |

Example 13

A silver bromide emulsion was prepared by a procedure similar in all respects to that described in Example 11 other than the rate of mixing of Solutions A and B. These solutions were mixed in 30 minutes instead of in 40 minutes. To portions of the emulsion, an aqueous dispersion of cuprous iodide was added to provide the range of concentrations tabulated below. Each portion was held at 40° C. for 15 minutes, with stirring, and then coated on paper. The coatings gave the following test results:

| Gram CuI/mole of silver halide | Photodevelopment time | | | |
|---|---|---|---|---|
| | 5 minutes | | 2 hour | |
| | $D_{min}$ | $\Delta D$ | $D_{min}$ | $\Delta D$ |
| 0 | 0.28 | 0.22 | 0.32 | 0.19 |
| 0.09 | 0.31 | 0.27 | 0.34 | 0.26 |
| 0.9 | 0.36 | 0.36 | 0.38 | 0.31 |
| 9.0 | 0.42 | 0.46 | 0.40 | 0.36 |
| 90.0 | 0.31 | 0.50 | 0.49 | 0.43 |

Example 14

An emulsion was prepared from solutions of the formulas of Example 11 by adding Solution A to Solution B over a 45-minute period, and then adding Solution C to the mixture over a similar period, the preparation being carried out at 84° C. The emulsion obtained was cooled to 40° C. rapidly, 750 ml. of a freshly made 30% solution of crystalline sodium sulfate was added, and the emulsion was further cooled to 5° C. A coagulum formed and settled out which was washed by pouring off the supernatent liquor, and replacing it successively with two 500 ml. quantities of chilled distilled water. The washed coagulum was dispersed by warming it with the volume of distilled water required to make emulsion volume equal to 250 ml. per mole of silver halide. To part of the emulsion, 20 grams of cuprous iodide were added per mole of silver halide. The mixture was stirred vigorously for an hour at 50° C., diluted with gelatin solution, and coated on paper. The coating and a control coating containing no cuprous iodide were tested, and gave the following results:

| Coating | Photodevelopment time | | | |
|---|---|---|---|---|
| | 5 minutes | | 2 hours | |
| | $D_{min}$ | $\Delta D$ | $D_{min}$ | $\Delta D$ |
| Control | 0.36 | 0.25 | 0.49 | 0.06 |
| With CuI | 0.37 | 0.55 | 0.31 | 0.54 |

Example 15

Thiourea compounds can be added to increase the writing speed and improve image stability to prolonged exposure to light. A silver halide emulsion is prepared according to Example 2 of McBride, U.S. Patent 3,271,157, issued Sept. 6, 1966. The emulsion is coagulated with sodium sulfate, washed and redispersed in water. Additional gelatin is added to bring the gelatin concentration to a value suitable for coating.

(1) Twenty grams of cuprous iodide, dispersed in aqueous gelatin, is added per mole of silver to one sample of the emulsion.

(2) 0.75 gram of ethylene thiourea dissolved in 50 ml. of a 1:1 ethanol-water mixture is added per mole of silver halide in another sample of the emulsion. After holding the emulsion for 5 minutes at 40° C., 20 grams of cuprous iodide dispersed in gelatin are added per mole of silver.

The respective emulsions are then coated on a paper base and tested.

| Sample | Photodeveloped to 325 f.c. | | | | | | Relative log writing speed | |
|---|---|---|---|---|---|---|---|---|
| | 10 secs. | | 5 min. | | 2 hrs. | | 10', 35 f.c. | 1', 325 f.c. |
| | $\Delta D$ | $D_{min}$ | $\Delta D$ | $D_{min}$ | $\Delta D$ | $D_{min}$ | | |
| 1 | 0.28 | 0.27 | 0.60 | 0.37 | 0.45 | 0.50 | 0.84 | 0.76 |
| 2 | 0.21 | 0.26 | 0.55 | 0.43 | 0.43 | 0.51 | 1.35 | 1.37 |

The images obtained in Samples 1 and 2 are about 15 to 20 times more stable to prolonged exposure to light of 60 f.c. intensity than an image obtained with commercial direct-print paper.

Similar results are obtained when thiourea, ethyl thiourea, alkyl thiourea, phenyl thiourea, and ethyl phenyl thiourea are substituted for the ethylene thiourea in the above emulsion.

Example 16

Separate silver halide emulsions are prepared, one prepared according to Example 11 by the conversion method (Emulsion A) and one according to Example 2 of McBride, U.S. Patent 3,271,157, issued Sept. 6, 1966 (Emulsion B).

The following data demonstrate the effect various cuprous additives have to the respective emulsions. Emulsion A is photodeveloped to 450 f.c. and Emulsion B to 325 f.c. All concentrations are in grams per mole of silver halide.

| | Photodevelopment time | | | |
|---|---|---|---|---|
| | 5 min. | | 2 hrs. | |
| | $D_{min}$ | $\Delta D$ | $D_{min}$ | $\Delta D$ |
| Emulsion A: | | | | |
| Control | 0.27 | 0.20 | 0.40 | 0.12 |
| CuBr (12.5 g./mole) | 0.27 | 0.24 | 0.38 | 0.21 |
| CuBr (12.5 g./mole), KI (3.3 g./mole) | 0.28 | 0.43 | 0.34 | 0.24 |
| CuI (3.25 g./mole) | 0.34 | 0.46 | 0.38 | 0.31 |
| Emulsion B: | | | | |
| Control | 0.21 | 0.15 | 0.36 | 0.11 |
| CuBr (15 g./mole) | 0.22 | 0.21 | 0.34 | 0.18 |
| CuCl (10 g./mole) | 0.21 | 0.16 | 0.35 | 0.14 |
| CuI (10 g./mole) | 0.29 | 0.58 | 0.42 | 0.35 |

All of the cuprous salts increase the discrimination obtained in each respective emulsion. Preferably, a water-soluble iodide salt is added to obtain maximum discrimination when cuprous bromide, cuprous chloride, or cuprous thiocyanate are added to the emulsion.

Example 17

A silver chlorobromide precipitate was prepared by a method analogous to that described in Example 15 for preparing silver halide grains, except gelatin was omitted from the system. The precipitate was washed by decantation, collected by filtration, washed with ethanol and then with ether. The precipitate is air dried at room temperature.

Thiourea in aqueous solution is added to separate samples of the silver halide powder in the concentrations in the following table. Cuprous iodide was added to each sample at 0.5 gram per gram of silver chlorobromide.

The powders are allowed to dry at room temperature and are then coated by smearing the powder over the surface of a transparent adhesive tape. The excess powder was shaken off and the tape mounted powder side down on a white paper.

| Gr./gr. AgClBr, Thiourea | 5 min. 325 f.c. | | 4 hr. 35 f.c. | | Relative log writing speed, ($\Delta D=0.1$) |
|---|---|---|---|---|---|
| | $\Delta D$ | $D_{min}$ | $\Delta D$ | $D_{min}$ | |
| 0 | 0.59 | 0.48 | 0.70 | 0.46 | 1.36 |
| 0.0005 | 0.56 | 0.27 | 0.80 | 0.24 | 1.53 |
| 0.016 | 0.36 | 0.53 | 0.53 | 0.49 | 1.85 |

Similar results are obtained when cuprous bromide and cuprous chloride are added to the system.

Example 18

Silver halide systems utilizing cuprous salts provide improved direct-print records as compared with similar emulsions containing cupric salts. A silver halide emulsion of the type disclosed in McBride, U.S. Patent 3,271,157 issued Sept. 6, 1966, is prepared according to Example 2. After coagulation and redispersion, various additions described below are made to portions of the emulsions followed by a short hold at 40° C. with stirring. The portions of treated emulsions are then coated on a photographic paper base as described in Example 2.

(1) Cuprous iodide is added in aqueous gelatin to aliquot portions followed by a 15-minute hold.

(2) Crystalline cupric sulfate ($CuSO_4 \cdot 2H_2O$) is added as a 12.5 percent solution in water to separate aliquot portions followed by a 5-minute hold.

4,4 - dimethylimadazoline-2-thione (A) and ethylene thiourea (B) are added as a solution in a suitable solvent (A in alcohol—B in a water alcohol mixture) followed by a 5-minute hold.

| Additives | Photodeveloped to 325 f.c. | | | | Relative log writing speed | |
|---|---|---|---|---|---|---|
| | 5 min. | | 2 hours | | 10', 35 f.c. | 1', 325 f.c. |
| | $\Delta D$ | $D_{min}$ | $\Delta D$ | $D_{min}$ | | |
| Control | 0.17 | 0.29 | 0.11 | 0.40 | 0.90 | 1.17 |
| CuI, 20 g./mole | 0.61 | 0.35 | 0.44 | 0.44 | 0.70 | 0.65 |
| CuSO$_4$, 187.5 ml./mole | 0.04 | 0.34 | 0.06 | 0.43 | <0 | <0 |
| CuSO$_4$, 187.5 ml./mole+KI, 90 ml./mole | 0.38 | 0.36 | 0.22 | 0.43 | 0.46 | 0.46 |
| CuI, 20 g./mole+A, 3.2 g./mole | 0.58 | 0.35 | 0.49 | 0.51 | 1.29 | 1.28 |
| CuSO$_4$, 187.5 ml./mole+KI, 90 ml./mole+A, 3.2 g./mole | 0.45 | 0.39 | 0.11 | 0.52 | 1.16 | 1.14 |
| CuI, 20 g./mole+B, 0.75 g./mole | 0.61 | 0.35 | 0.47 | 0.48 | 1.38 | 1.31 |
| CuSO$_4$ 187.5 ml./mole+KI, 90 ml./mole+B, 0.75 g./mole | 0.45 | 0.35 | 0.26 | 0.43 | 1.07 | 1.05 |

It is apparent that the emulsions containing cuprous salts produce much better image discrimination ($\Delta D$) than the corresponding emulsions containing cupric salts. A substantial improvement in relative log writing speed is also observed with cuprous salts as compared with the cupric salts.

Example 19

Reducing sugars can be added to the silver halide systems of this invention to improve the writing speed of a composition which is rapidly dried at high temperatures.

A silver bromide emulsion is prepared according to Example 2 of McBride, U.S. Patent 3,271,157. 0.75 g./mole of silver of ethylene thiourea, 6.0 g./mole of sodium sulfite and 7 g./mole of cuprous iodide are added to the emulsion. Gelatin is added to a concentration of 270 g./mole of Ag.

Various amounts of reducing sugars, dissolved in water, are added to the emulsion which is then coated at 7.0 ml./sq. ft. and dried. The dry bulb temperature in the initial drying stage was at 95° F. and the final stages at 105° F.

The samples were tested according to the standard procedure mentioned above except at the specified intensities.

| Reducing sugar (g./mole AgBr) | Relative log speed | |
|---|---|---|
| | 35 lu/sq. ft. | 325 lu/sq. ft. |
| None (control) | 1.22 | 1.09 |
| d-Glucose (10) | 1.36 | 1.20 |
| d-Glucose (100) | 1.42 | 1.35 |
| d-Glucose (200) | 1.45 | 1.32 |
| Glyceraldehyde (100) | 1.37 | 1.25 |
| Arabinose (50) | 1.39 | 1.29 |
| Galactose (50) | 1.41 | 1.29 |

Non-reducing sugars such as sucrose have substantially no affect on the writing speed. A sample containing sucrose gives similar writing speeds as the control sample.

Other reducing agents, namely hydroquinone, pyrogallol, ascorbic acid, salicylic acid and resorcinal provide a writing speed similar to the control sample when utilized in the emulsion.

Example 20

Cadmium salts can be utilized in the present silver halide systems to improve photographic properties of the system.

Silver bromoiodide (95 mole percent bromide and 5 mole percent iodide) is prepared by mixing an ammonical silver nitrate solution with an aqueous mixture of potassium bromide and potassium iodide. The silver halide was coagulated, washed and dried.

Two grams of the silver halide are thoroughly mixed with the compounds in the following table and 2 ml. of distilled water. The mixture is allowed to dry overnight. The power is coated by spreading it over the adhesive surface of a transparent tape to give a moderately uniform layer. The coating is placed, powder side down, on a white paper and tested by the standard procedure.

| Additive | Photodeveloped | | | |
|---|---|---|---|---|
| | 5 min. at 325 f.c. | | 4 hrs. at 35 f.c. | |
| | $\Delta D$ | $D_{min}$ | $\Delta D$ | $D_{min}$ |
| 0.1 gr. CuI (control) | 0.41 | 0.56 | 0.59 | 0.63 |
| 0.1 gr. CuI/0.05 gr. CdBr$_2$ | 0.67 | 0.27 | 0.80 | 0.33 |
| 0.1 gr. CuI/0.07 gr. CdI$_2$ | 0.67 | 0.26 | 0.84 | 0.24 |
| 0.08 gr. CuBr/0.07 gr CdI$_2$ | 0.70 | 0.23 | 0.89 | 0.25 |

Example 21

Silver bromide was prepared according to McBride, U.S. Patent 3,271,157, except gelatin was omitted from the mixture resulting in a silver bromide powder. Two grams of the silver bromide powder is mixed respectively with the following constituents and coated by the procedure of Example 17.

| Additive | Photodeveloped | | | | Relative log writing speed |
|---|---|---|---|---|---|
| | 5 min. at 325 f.c. | | 4 hrs. at 35 f.c. | | |
| | $\Delta D$ | $D_{min}$ | $\Delta D$ | $D_{min}$ | |
| 0.1 g. CuI | 0.41 | 0.47 | 0.74 | 0.44 | 1.43 |
| 0.1 g. CuI/0.07 g. CdI$_2$ | 0.63 | 0.26 | 0.93 | 0.29 | 1.08 |
| 0.1 g. CuI/0.07 g. CdI$_2$/0.004 g. thiourea | 0.52 | 0.20 | 0.90 | 0.24 | 1.39 |
| 0.1 g. CuI/0.07 g. CdI$_2$/0.004 g. thiosemicarbazide | 0.45 | 0.19 | 0.70 | 0.33 | 0.94 |

Thiourea compounds restore writing speed lost through the addition of the cadmium salt while compounds such as thiosemicarbazides have little or no effect on writing speed.

Example 22

Stannous salts can be used to decrease $D_{min}$ of the direct-print silver halide systems containing cuprous salts.

Silver bromide is precipitated as in the previous example. Two grams of resulting silver bromide powder is mixed with the following constituents, coated on transparent tape and tested.

| Additive | Photodeveloped | | | |
|---|---|---|---|---|
| | 5 min. at 325 f.c. | | 4 hrs. at 35 f.c. | |
| | $\Delta D$ | $D_{min}$ | $\Delta D$ | $D_{min}$ |
| 0.1 g. CuI | 0.58 | 0.42 | 0.73 | 0.37 |
| 0.1 g. CuI/0.01 g. SnCl$_2$.2H$_2$O | 0.74 | 0.21 | 0.87 | 0.22 |
| 0.1 g. CuI/0.05 g. SnCl$_2$.2H$_2$O | 0.77 | 0.25 | 0.90 | 0.20 |
| 0.05 g. SnCl$_2$.2H$_2$O | 0.05 | 0.23 | 0.11 | 0.17 |

A similar lowering of background levels is obtained when stannous chloride is used in conjunction with cuprous chloride, cuprous bromide, or cuprous thiocyanate.

The invention has been described in considerable detail with reference to preferred embodiments thereof, but it will be understood that variations and modifications can be effected within the spirit and scope of the invention as described hereinabove and as defined in the appended claims.

We claim:

1. A photodevelopable, direct-print composition comprising a cuprous salt in admixture with silver halide wherein said silver halide is predominantly silver bromide.

2. A composition according to claim 1 wherein at least 70 mole percent of said silver halide is silver bromide.

3. A composition according to claim 1 which is substantially free of a colloidal binder.

4. A composition according to claim 1 further comprising a colloidal binder.

5. A composition according to claim 4 wherein said colloidal binder is gelatin.

6. A composition according to claim 1 wherein said cuprous salt is substantially all cuprous iodide.

7. A composition according to claim 1 comprising from about 3 to about 100 grams of cuprous iodide per mole of silver halide.

8. A composition as described in claim 1 wherein the silver halide was prepared at a temperature of about 65° to 85° C. in an acidic aqueous medium containing a water-soluble bromide and a water-soluble thiocyanate to form silver halide containing at least 70 mole percent of bromide and having grains with a mean projected area of about .6 to 2.5 square microns.

9. A composition as described in claim 1 wherein lead ions are present in the aqueous medium during the formation of the silver halide.

10. A composition according to claim 1 further comprising a water-soluble sulfite.

11. A composition according to claim 10 wherein said sulfite is an inorganic compound.

12. A composition according to claim 10 comprising from about .004 to about .4 mole of said sulfite per mole of silver halide.

13. A composition according to claim 1 further comprising an organic sulfur containing compound having a thiourea group.

14. A composition according to claim 1 further comprising ethylene thiourea or thiourea.

15. A composition according to claim 13 comprising about .1 millimole to about .1 mole of said sulfur containing compound.

16. A composition according to claim 1 further comprising cadmium salts.

17. A composition according to claim 1 comprising cadmium salts and an organic sulfur containing compound having a thiourea grouping.

18. A composition according to claim 1 further comprising stannous salts.

19. A composition according to claim 1 further comprising stannous chloride.

20. A composition according to claim 1 further comprising a colloidal binder and a reducing sugar.

21. A composition according to claim 20 comprising from about 1 gram to about 500 grams of said reducing sugar per mole of silver halide.

22. A composition according to claim 20 wherein said reducing sugar is d-glucose, glyceraldehyde, arabinose, galactose, maltose or mellibiose.

23. A composition according to claim 1 wherein said silver halide is precipitated in the presence of an organic thioether.

24. A composition according to claim 1 wherein said silver halide is precipitated in the presence of a thiocyanate.

25. A composition according to claim 1 wherein said silver halide has sensitivity internal to the grains of said silver halide.

26. A composition according to claim 1 wherein said silver halide comprises silver halide grains having a predominant amount of sensitivity internal to said grains.

27. A composition according to claim 1 wherein said cuprous salt is cuprous chloride, cuprous bromide, or cuprous thiocyanate and wherein said composition further comprises a water-soluble iodide.

28. A photodevelopable, direct-print emulsion comprising a cuprous salt, a silver halide which is predominantly silver bromide, a colloidal binder, a water-soluble inorganic sulfite and an organic sulfur containing compound having a thiourea group, wherein said cuprous salt has been mixed with said silver halide after formation of said silver halide.

29. A composition according to claim 28 wherein said cuprous salt is substantially all cuprous iodide.

30. A composition according to claim 29 which further comprises a water-soluble sulfite and glucose.

31. A photodevelopable, direct-print emulsion comprising cuprous salts in admixture with a silver halide which is predominantly silver bromide and has been prepared in the presence of an organic thioether in a gelatinous medium.

32. A composition according to claim 31 wherein plumbous ions are present during the silver halide precipitation.

33. A composition according to claim 31 further comprising reducing sugars.

34. A composition according to claim 31 further comprising glucose.

35. A composition according to claim 1 wherein said admixture has been heated to temperatures above 30° C.

36. A photodevelopable, direct-print composition comprising silver halide grains wherein said silver halide is predominantly silver bromide and wherein a cuprous salt has been added to said composition after the formation of said silver halide grains.

References Cited

UNITED STATES PATENTS 3,178,292   4/1965   Fix ------------------ 96—108

OTHER REFERENCES

F. Moser et al.: Optical Absorption Studies of the Volume Photolysis of Large Silver Chloride Crystals in Physics and Chemistry of Solids, vol. 9, 1959, pp. 223–224 QC 176, p. 4.

NORMAN G. TORCHIN, *Primary Examiner.*

R. FICHTER, *Assistant Examiner.*